(12) United States Patent
Gupta et al.

(10) Patent No.: US 11,061,599 B2
(45) Date of Patent: Jul. 13, 2021

(54) VOLUME MIGRATION IN A FEDERATED STORAGE ARRAY WITH NON-VOLATILE MEMORY EXPRESS OVER FABRIC (NVMEOF) HOST ATTACHMENT

(71) Applicant: EMC IP Holding Company LLC, Hopkinton, MA (US)

(72) Inventors: Mukesh Gupta, Shrewsbury, MA (US); Dmitry Tylik, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 52 days.

(21) Appl. No.: 16/524,464

(22) Filed: Jul. 29, 2019

(65) Prior Publication Data

US 2021/0034270 A1    Feb. 4, 2021

(51) Int. Cl.
*G06F 3/06* (2006.01)
*G06F 13/16* (2006.01)

(52) U.S. Cl.
CPC .......... *G06F 3/0647* (2013.01); *G06F 3/0604* (2013.01); *G06F 3/0679* (2013.01); *G06F 13/1668* (2013.01)

(58) Field of Classification Search
CPC .... G06F 3/0647; G06F 3/0604; G06F 3/0679; G06F 13/1668
See application file for complete search history.

(56) References Cited

U.S. PATENT DOCUMENTS

| | | | |
|---|---|---|---|
| 10,764,180 B1* | 9/2020 | Klein | H04L 45/745 |
| 2012/0278572 A1* | 11/2012 | Broido | G06F 3/0607 |
| | | | 711/162 |
| 2019/0354302 A1* | 11/2019 | Enz | G06F 3/0622 |

* cited by examiner

*Primary Examiner* — Jane Wei
(74) *Attorney, Agent, or Firm* — Daly, Crowley Mofford & Durkee, LLP

(57) ABSTRACT

An aspect of volume migration includes establishing a connection between hosts and a non-volatile memory over fabric (NVMeoF) controller for appliances, and creating and exposing a volume as a namespace to hosts. The namespace forms part of an asymmetric namespace access (ANA) group in which optimized paths are exposed to the hosts. Upon receiving a request to migrate the volume from a source appliance to a destination appliance, an aspect further includes creating a namespace on the destination, and configuring the ANA group of the namespace as inaccessible. Through the connection, an aspect includes initiating an asynchronous event notification (AEN) to the host to connect ports on the destination and, upon connecting to the ports, discovering by the hosts on the destination, the namespace created, verifying the hosts have connected to the ports and have discovered the namespace, and migrating data to the destination and performing input/output cutover.

18 Claims, 16 Drawing Sheets

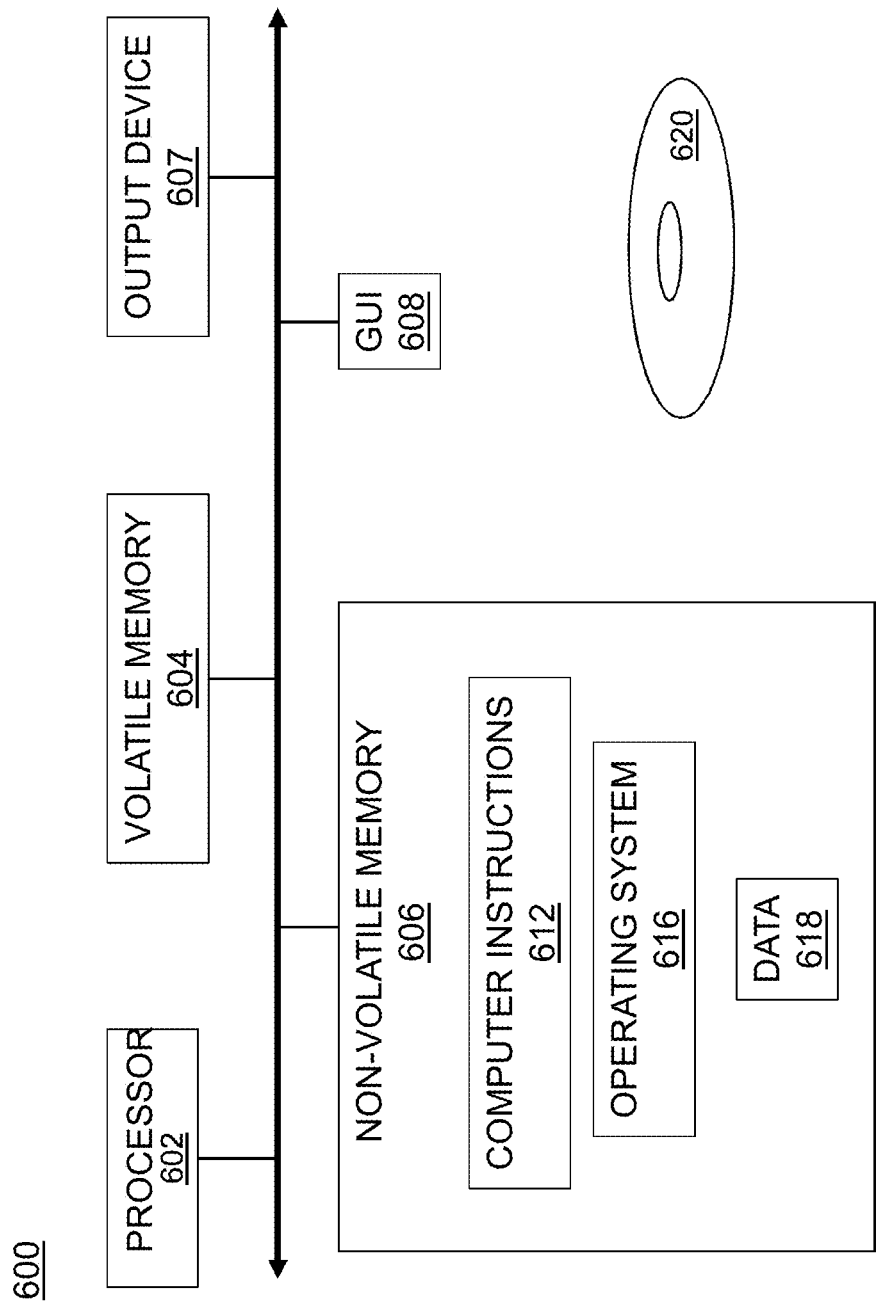

VOLUME MIGRATION IN A FEDERATED STORAGE ARRAY WITH NON-VOLATILE MEMORY EXPRESS OVER FABRIC (NVMEOF) HOST ATTACHMENT

BACKGROUND

Oftentimes storage systems require data to be migrated between various appliances due to situations, such as planned maintenance on the storage system and load balancing among the appliances. Migration processes can significantly impact performance for clients that rely on the storage system as the processes can be time consuming due to factors such as manual intervention by an administrator and steps needed to prepare the storage system for the migration, such as a rescan of the system.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for volume migration in a federated storage array. The method includes establishing a persistent connection between hosts and a non-volatile memory over fabric (NVMeoF) discovery controller for appliances residing in the storage array. The method also includes creating a volume and exposing the volume as a namespace to the hosts. The namespace forms part of an asymmetric namespace access (ANA) group in which optimized paths are exposed to the hosts. Upon receiving a request to migrate the volume from a source appliance of the appliances to a destination appliance of the appliances, the method includes creating a NVMeoF namespace on the destination appliance, and configuring the ANA group of the NVMeoF namespace as inaccessible. Through the persistent connection to the discovery controller, the method includes initiating an asynchronous event notification (AEN) to the host to connect ports on the destination appliance and, upon connecting to the ports, discovering by the hosts on the destination appliance the NVMeoF namespace created on the destination appliance, verifying the hosts have connected to the ports and have discovered the NVMeoF namespace, and migrating data for the volume to the destination appliance and performing input/output (IO) cutover.

Another aspect may provide a system for volume migration in a federated storage array. The system includes a memory having computer-executable instructions and a processor executing the computer-executable instructions. The computer-executable instructions when executed by the processor cause the processor to perform operations. The operations include establishing a persistent connection between hosts and a non-volatile memory over fabric (NVMeoF) discovery controller for appliances residing in the storage array. The operations also include creating a volume and exposing the volume as a namespace to the hosts. The namespace forms part of an asymmetric namespace access (ANA) group in which optimized paths are exposed to the hosts. Upon receiving a request to migrate the volume from a source appliance of the appliances to a destination appliance of the appliances, operations include creating a NVMeoF namespace on the destination appliance, and configuring the ANA group of the NVMeoF namespace as inaccessible. Through the persistent connection to the discovery controller, the operations further include initiating an asynchronous event notification (AEN) to the host to connect ports on the destination appliance and, upon connecting to the ports, discovering by the hosts on the destination appliance the NVMeoF namespace created on the destination appliance, verifying the hosts have connected to the ports and have discovered the NVMeoF namespace, and migrating data for the volume to the destination appliance and performing input/output (IO) cutover.

Another aspect may provide a computer program product for volume migration in a federated storage array. The computer program product is embodied on a non-transitory computer readable medium. The computer program product includes instructions that, when executed by a computer, causes the computer to perform operations. The operations include establishing a persistent connection between hosts and a non-volatile memory over fabric (NVMeoF) discovery controller for appliances residing in the storage array. The operations also include creating a volume and exposing the volume as a namespace to the hosts. The namespace forms part of an asymmetric namespace access (ANA) group in which optimized paths are exposed to the hosts. Upon receiving a request to migrate the volume from a source appliance of the appliances to a destination appliance of the appliances, operations include creating a NVMeoF namespace on the destination appliance, and configuring the ANA group of the NVMeoF namespace as inaccessible. Through the persistent connection to the discovery controller, the operations further include initiating an asynchronous event notification (AEN) to the host to connect ports on the destination appliance and, upon connecting to the ports, discovering by the hosts on the destination appliance the NVMeoF namespace created on the destination appliance, verifying the hosts have connected to the ports and have discovered the NVMeoF namespace, and migrating data for the volume to the destination appliance and performing input/output (IO) cutover.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 6 is a block diagram of an illustrative computer that can perform at least a portion of the processing described herein.

DETAILED DESCRIPTION

Figure 1:
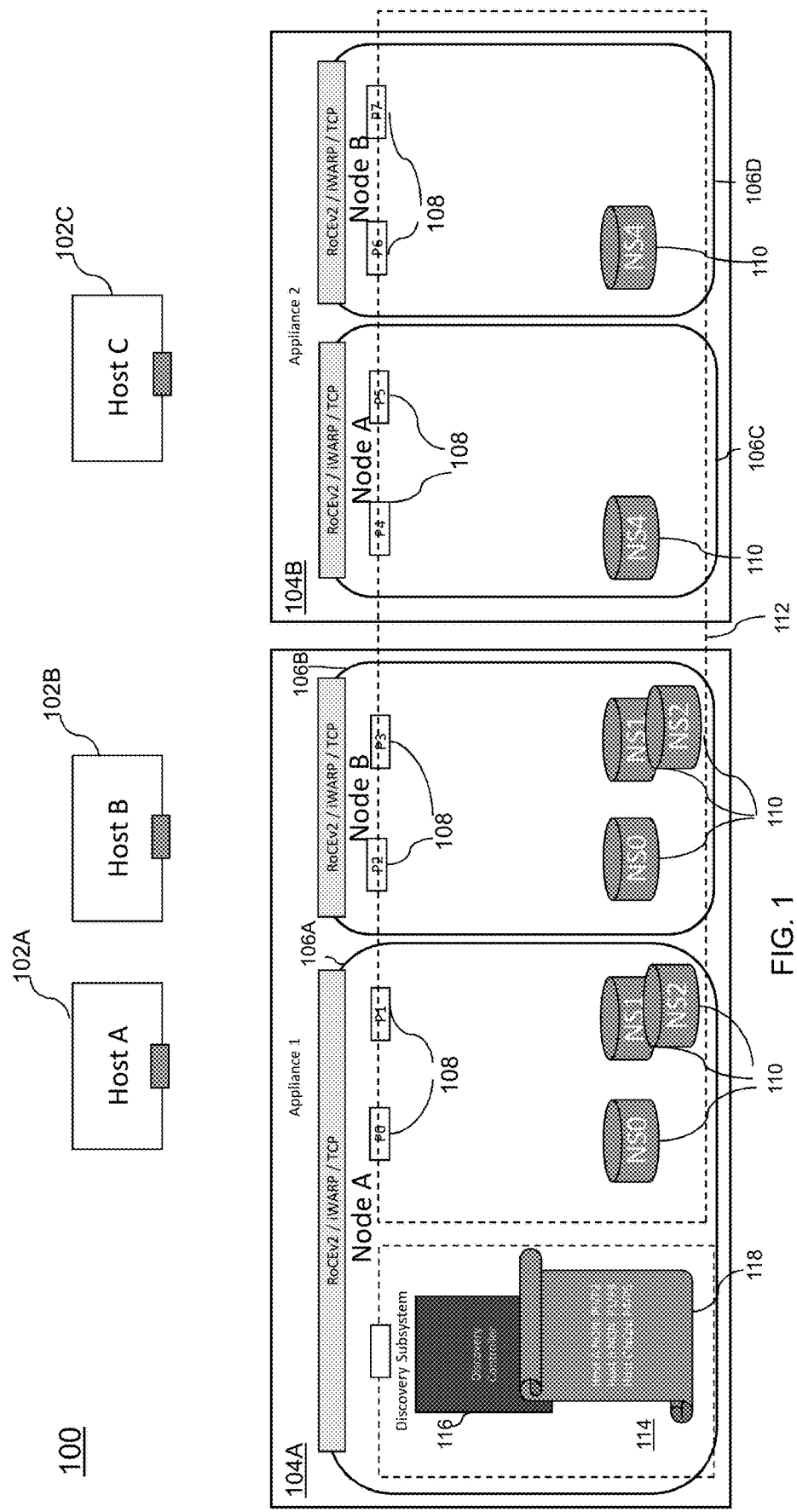
FIG. 1 is a block diagram of a system upon which volume migration in a federated storage array may be implemented in accordance with an embodiment.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives.

In certain embodiments, a data storage entity may be any one or more of a file system, object storage, a virtualized device, a logical unit, a logical unit number, a logical volume, a logical device, a physical device, and/or a storage medium.

Non-Volatile Memory Express over Fabric (NVMeoF) is a technology specification designed to enable nonvolatile memory express message-based commands to transfer data between a host computer and a target solid-state storage device or system over a network, such as Ethernet, Fibre Channel (FC) or InfiniBand.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

As indicated above, storage systems oftentimes require data to be migrated between various appliances due to situations, such as planned maintenance on the storage system and load balancing among the appliances. Migration processes can significantly impact performance for clients that rely on the storage system as the processes can be time consuming due to factors such as manual intervention by an administrator and steps needed to prepare the storage system for the migration, such as a rescan of the system.

In embodiments, volume migration in a federated storage array with Non-Volatile Memory Express over Fabric (NVMeoF) host attachment is provided. The techniques described herein provide a means for performing data migration in a storage system that is automated (e.g., does not involve manual intervention), avoids disruption to the host during the migration, and is scalable. The techniques draw on features of the NVMeoF protocol to realize the advantages of the embodiments, as will be described herein.

Turning now to FIG. 1, a system 100 for implementing volume migration in a federated storage array with NVMeoF host attachment will now be described. The system 100 is implemented using various constructs of the NVMeoF protocol. The system 100 includes hosts A-C (102A-102C), appliances 1 and 2 (104A and 104B, respectively), nodes A and B (106A-106B) on appliance 1, nodes A and B (106C-106D) on appliance 2, ports P0-P7 (108), and namespaces (collectively referred to as 110).

Figure 2:
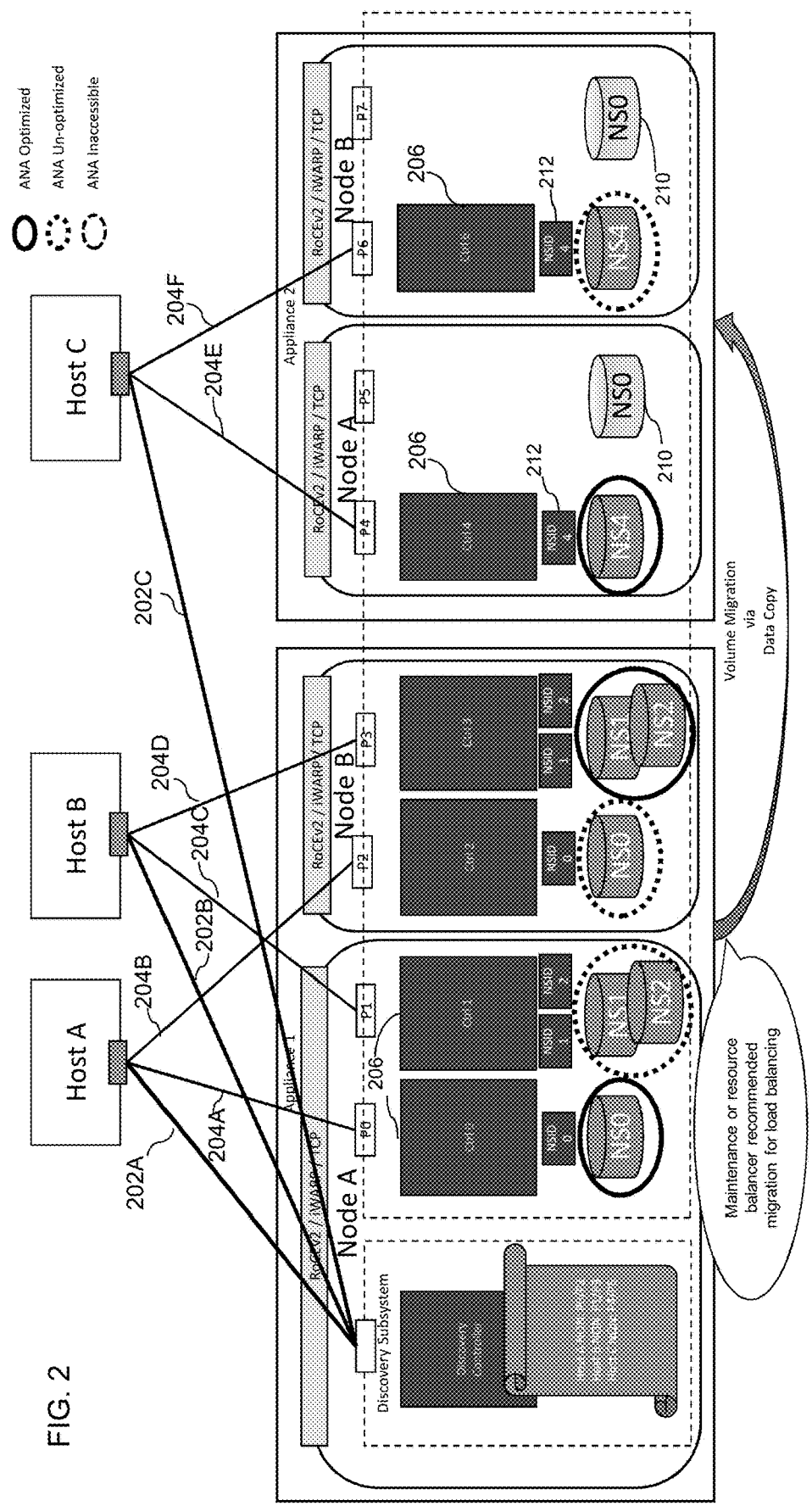
FIG. 2 is a block diagram of the system of FIG. 1 showing interconnections among components for use in implementing volume migration in a federated storage array in accordance with an embodiment.

The nodes 106 can be any type of hardware, such as a server with one or more processors, controllers, and memory. In embodiments, the appliances 104A and 104B each refer to a collection of nodes 106. The namespaces 110 can be volumes or other storage media. Depictions of NS0, NS1, and NS2 on nodes A and B are paths to the same respective namespaces, as each pair of the namespaces NS0, NS1, and NS2 is not only the same storage but is also the same identity. Thus, e.g., namespace NS0 on nodes A and B reflects two paths, one on each node. In addition, two representations of namespace NS4 are shown in FIG. 2, one representation is shown in node A of appliance 2 and the other representation is shown in node B of appliance 2. Thus, e.g., each representation of NS4 reflects an individual path on each node. The namespaces NS0, NS1, and NS2 in appliance 1 are considered captive in that they are not accessible to the appliance 2. Similarly, the namespace NS4 in nodes A and B in appliance 2 is not accessible to the appliance 1.

The appliances 1 and 2 may collectively form a cluster 112. While only two appliances 104A and 104B are shown in FIG. 1, it will be understood that more than two appliances may be used to implement the embodiments described herein.

The system also includes a discovery controller subsystem 114 that includes a discovery controller 116 and asynchronous event notification (AEN) data. The AEN data may be stored in a repository 118 at the subsystem 114. The discovery controller subsystem 114 provides information to hosts about the location of storage, e.g., which port they can access for data (e.g., through IP address of corresponding nodes). The discovery controller 116 may be implemented as a logical entity. While the discovery subsystem 114 is shown in node A of appliance 1, it will be understood that the discovery subsystem 114 may reside anywhere in the storage system 100, as long as it is accessible to the storage system components.

Turning now to FIG. 2, a system 200 illustrating connections among hosts and associated appliances for use in implementing volume migration in a federated storage array will now be described. The system 200 of FIG. 2 is substantially similar to the system 100 of FIG. 1.

In an embodiment, a resource balancer (not shown) communicatively coupled may facilitate the initial placement of hosts A-C with respect to appliances. An example placement is shown in FIG. 2. The system 200 shows a connection 202A between the discovery subsystem 114 and the host A. The system 200 also shows a connection 202B between discovery subsystem 114, and the host B. The system 200 further shows a connection 202C between discovery subsystem 114 and the host C. These connections 202A-202C are persistent in that they are maintained indefinitely between the discovery subsystem 114 and the hosts A-C.

In an embodiment, the host A connects to the discovery subsystem 114 choosing a NVM qualified name (NQN), which identifies the host A to the subsystem 114. The NQN is stored in AEN repository 118. The discovery controller returns an identification of one or more ports IO subsystem to which the host A may connect. As indicated above, this initial decision may be implemented by a resource balancer. As shown in FIG. 2, the ports provided by the discovery controller include P0 and P2. This port information is stored in the AEN repository 118 with the corresponding NQN. Additional information may be provided to the host A by the discovery controller, e.g., IP address, TCP port, etc.). As the host A connects to the ports P0 and P2, an NVMe logical construct (e.g., controller) accesses client software. A separate controller is associated with each host connection through the ports P0-P7 and is collectively shown as 206 in FIG. 2. The controller 206 is responsible for receiving commands on the respective path and returning responses.

Each controller uses a set of namespace identifiers (NSIDs) to identify a list of namespaces attached to it. The NSIDs are collectively referred to as 212. As shown in FIG. 2 with respect to node A of appliance 1, NSID 0 identifies namespace NS0 and is accessible from controller 0 and port P0, NSID 1 identifies namespace NS1 and is accessible from controller 1 and port P1, NSID 2 identifies namespace NS2 and is accessible from controller 1 and port P1. Namespace NS4 is similarly identified on node A/node B of appliance 2 and is accessible from the corresponding controllers and ports.

As shown in FIG. 2, host A is assigned two ports, port P0 on node A and port P2 on node B. In the event one node goes down, the host A is still able to access the same namespace NS0. For example, if node A goes down, the host A can access namespace NS0 via controller 2 from port 2. Thus, the host A has multiple paths to the same namespace. Because there are multiple paths to the same storage from the host, the system assigns asymmetric namespace access (ANA) optimization priorities to indicate which path is the preferred path that the host A should use. As shown in FIG. 2, for example, NS0 on node A is the preferred/optimized namespace (via the solid circle encapsulating the namespace) and NS0 on node B is considered non-optimized (via the dotted circle encapsulating the namespace). The NS0 on node B is assigned a non-optimized priority. Thus, the path from node A is optimized and the path from node B is not optimized. The optimized path is determined to provide better performance for the host.

Similar to the connection performed for host A, the host B also connects to the discovery subsystem choosing a NVM qualified name (NQN). The NQN is stored in AEN repository 118. The discovery controller returns an identification of one or more ports' IO subsystem to which the host B may connect. As shown in FIG. 2, the ports provided by the discovery controller include P1 and P3. This port information is stored in the AEN repository 118 with the corresponding NQN. Additional information (IP address, TCP port, etc.) may be provided to the host B by the discovery controller. As the host B connects to the ports P1 and P3, a NVMe logical construct (e.g., controller) accesses client software.

The controller uses a namespace identifier (NSID) 212 to identify the namespace in the node. The host B is assigned two ports, one port P1 on node A and another port P3 on node B, both of which nodes are in appliance 1. In the event one node goes down, the host B will still be able to access the same namespaces NS1 and NS2. For example, if node A goes down, the host B can access namespaces NS1 and NS2 via controller 3 from port 3. Thus, the host B has multiple paths to the same namespace. The system assigns ANA optimization priorities to indicate which the preferred path the host B should use. As shown in FIG. 2, NS1 and NS2 on node B is the preferred/optimized namespace and NS1 and NS2 on node A is considered non-optimized. The optimized paths for node B are determined to provide better performance to the host B.

Host C also connects to the discovery controller choosing a NQN, which is stored in AEN repository 118. The discovery controller returns an identification of one or more ports IO subsystem to which the host C may connect. As shown in FIG. 2, the ports provided by the discovery controller include ports P4 and P6, which is stored in the AEN repository 118 with the corresponding NQN. Additional information (IP address, TCP port, etc.) may be provided to the host C by the discovery controller. As the host C connects to the ports P4 and P6, a NVMe logical construct (e.g., controller) accesses client software.

The host C is assigned two ports, one port P4 on node A and the other port P6 on node B, both in appliance 2. In the event one node goes down, the host C will still be able to access the same namespace NS4. For example, if node A goes down, the host C can access namespace NS4 via controller 6 from port 6. Thus, the host C has multiple paths to the same namespace. The system assigns ANA optimization priorities to indicate which path is the preferred path that the host C should use. As shown in FIG. 2, NS4 on node A is the preferred/optimized namespace and NS4 on node B is considered non-optimized. The optimized path in node A is determined to provide better performance to the host.

As indicated above, while each appliance can access its data from different nodes in a single appliance, each appliance is unable to directly access its data from another appliance. The data needs to be moved in order for this access. If load should increase on one appliance that negatively impacts performance (e.g., many machines with client connected storage from a single appliance), it would be beneficial to be able to enable the appliances to share the storage (e.g., move the storage or volumes used by a particular client to another appliance in the cluster without impacting performance).

Currently, there are two techniques for migration. In a first technique, a rescan is involved. When a client accesses storage from an appliance it does not have paths to the same storage on a different appliance until the data is moved between appliances. As to when data is migrated from source to destination appliance, an administrator needs to rescan new paths, which is a manual process, so that the client can access the new paths. Initially, the client will need to access both old and new paths to the storage while storage is moved to the new destination until storage is removed from the original location.

In the second technique, before initiating the migration, the client has limited paths to a namespace; thus, the process doesn't scale as the number of appliances increase.

The migration processes described herein do not require a rescan, are automated and seamless, and offer scalability. In embodiments, the migration processes utilize a persistent connection between the discovery controller and hosts, as well as asynchronous (async) event notifications (AENs) from the discovery controller to the hosts.

Figure 3A:
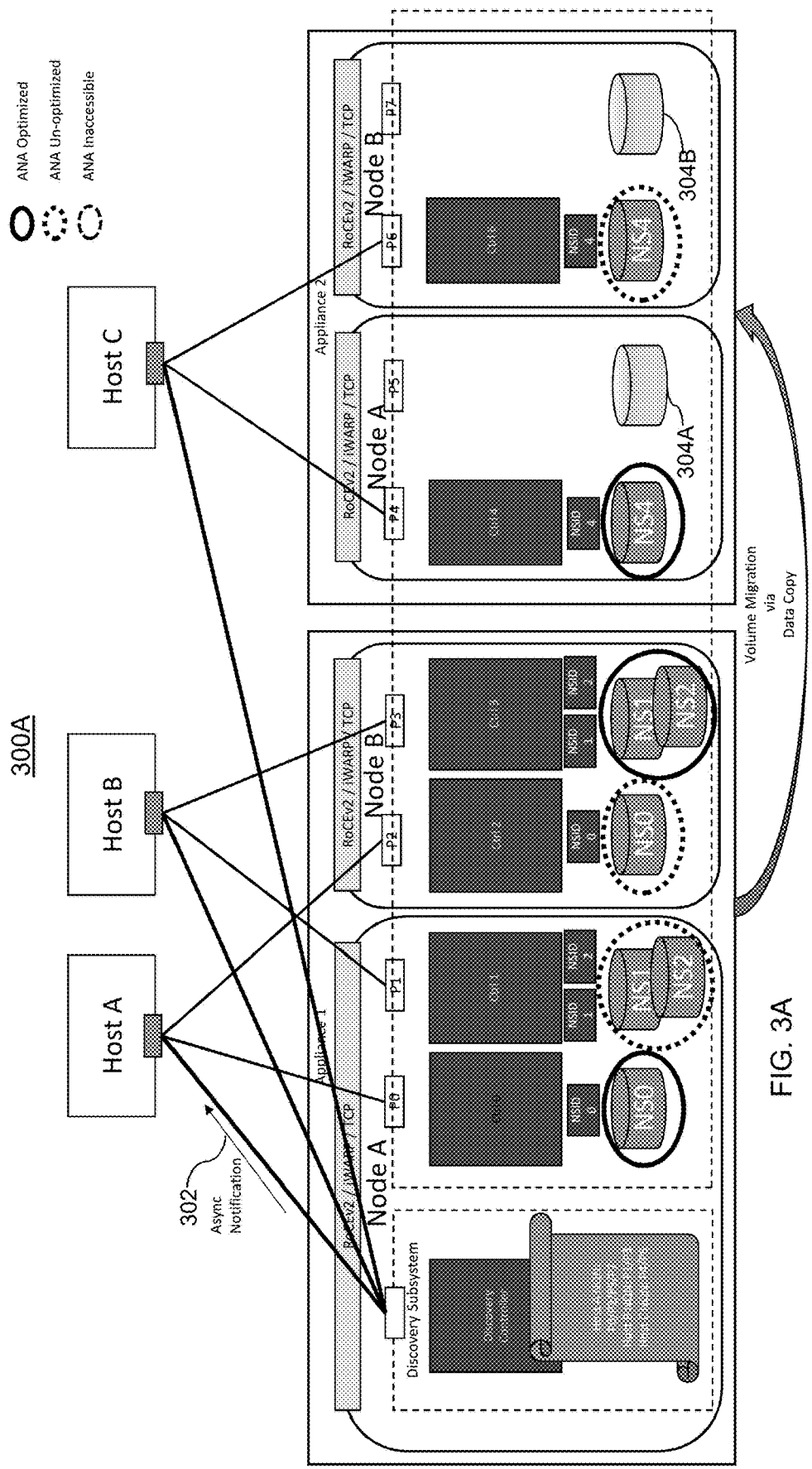
FIGS. 3A-3F are block diagrams of a system showing sequences of operations performed to implement the volume migration in a federated storage array in accordance with an embodiment.

Turning now to FIGS. 3A-3F, a migration process is illustrated in a sequence of diagrams 300A-300F will now be described. The process may be implemented when the system needs to perform system maintenance or when load balancing between appliances 1 and 2 is desired. The diagrams 300A-300F correspond to the system 200 of FIG. 2A. FIG. 3A illustrates two hosts A and B connected to appliance 1 and one host C connected to appliance 2. In an example scenario, it is determined that appliance 2 has extra CPU and memory available, and appliance 1, due to two hosts connected, is not performing optimally. The process seeks to ensure a seamless migration from appliance 1 to appliance 2 happens when a namespace is moved.

Figure 3B:
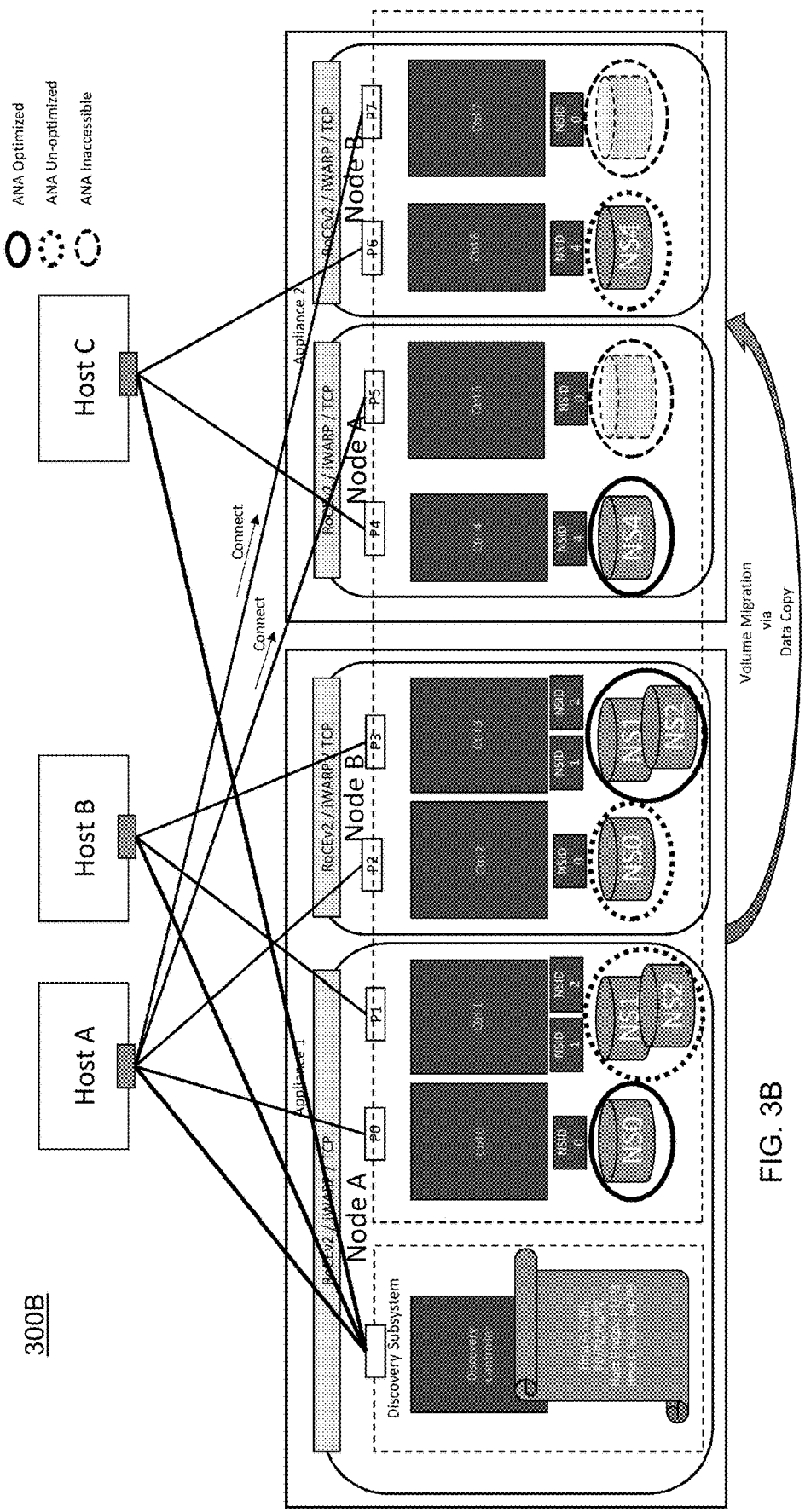

In FIG. 3A, the discovery controller sends an async event notification 302 over the persistent connection to the host A. The notification tells the host A that access to the namespace NS0 is not only available to ports P0 and P2 but now it is also available to ports P5 (NS0 304A) and P7 (NS0 304B). Now there are additional ports available on the appliance 2, and in FIG. 3B, the host A connects to the ports P5 and P7; however, the NS0 on ports P5 and P7 are assigned ANA inaccessible, as shown in FIG. 3B by the dashed lines encapsulating the namespace. Thus, during this time, host A continues to use its NVMe-optimized path from port P0 and maintains its non-optimized connection to port P2. The same NSID is created as if it is connected to the same storage.

Figure 3C:
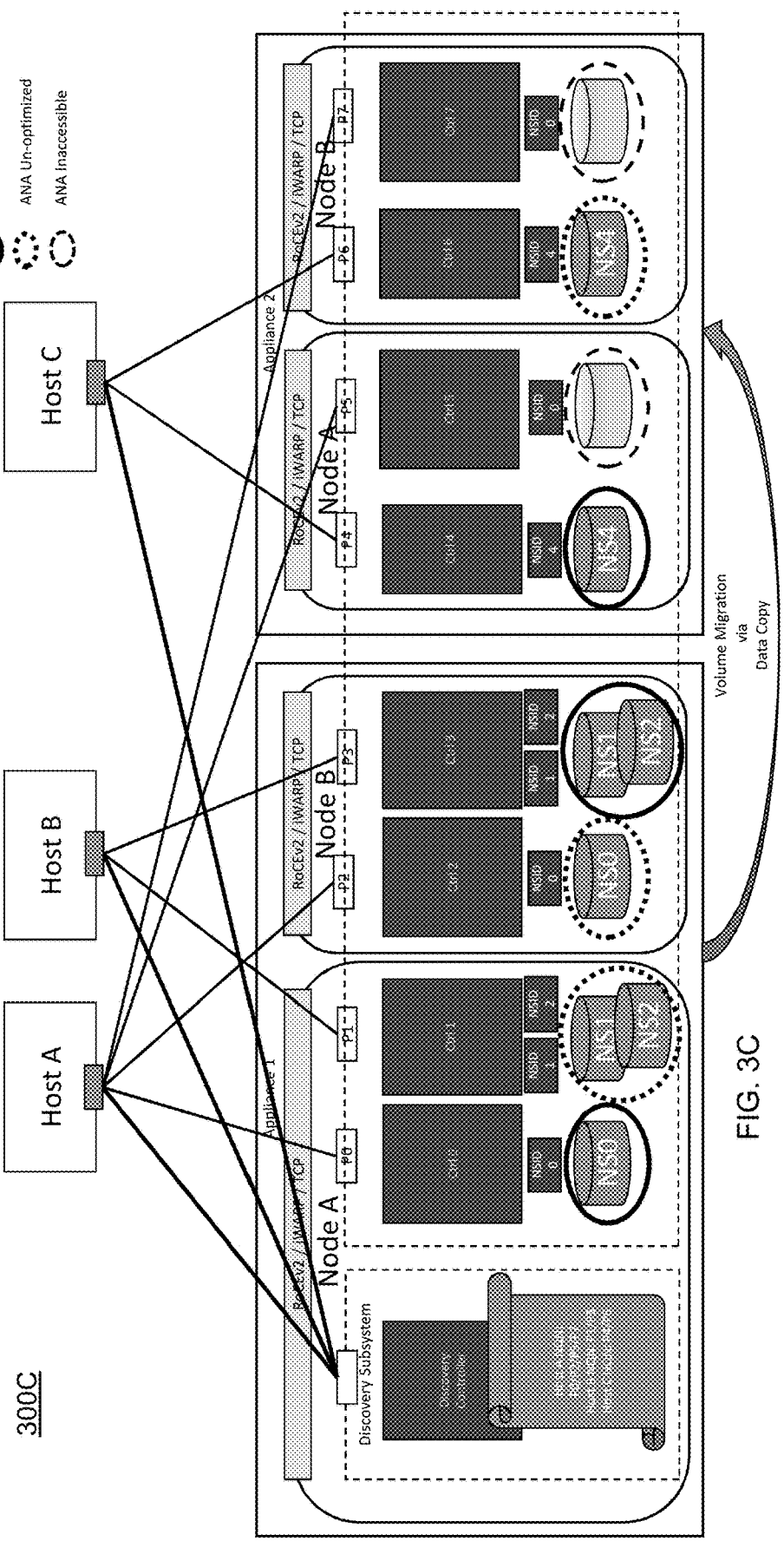

In FIG. 3C, the host A has connected to the ports P5 and P7, and the namespaces NS0 at ports P5 and P7 are created as a placeholder on appliance 2. As shown in FIG. 3C, the namespaces at ports P5 and P7 are temporarily designated as inaccessible (as shown by the dashed lines encapsulating the namespaces) as there is no storage attached. From the host A perspective it is still doing IO to port P0 because P0 is the optimized path.

Before changing the ANA states from appliance 1 to appliance 2, synchronous mirror is successfully enabled (i.e., all NVMe writes initiated by the host A to NS0 on appliance 1 are copied over to NS0 on appliance 2 before acknowledging to host A as successful, all input/output (IO) in progress is flushed from the source (appliance 1) to the destination (appliance 2), and incoming NVMe commands are frozen (e.g., for approximately 1.5 seconds). The ANA states are then changed to reflect the cutover and the IO are released. A cutover refers to a process of re-directing IO transactions targeted to NS0 from its former location on the appliance 1 to the new location on the appliance 2. This redirection happens for all IO transactions from a certain point onward. There is never a point in time when some IO is successfully completed at appliance 1 and some other IO at appliance 2. All IO frozen and subsequently released by the appliance 1 are failed by upon release and the host is requested to retry those IO. Based on ANA path states the host A knows the new NS0 location on the appliance 2.

The notification over the persistent connection to the host A provides an automated means to move the host A to the selected migration path. No rescan by an administrator is needed to create additional paths. The notification lets the host A know to programmatically connect to the new path that is identified in the AEN. At this point, host A has four paths to the same volume in the cluster: two in appliance 1 and two in appliance 2. Of these four paths, one is optimized, one is non-optimized, and two are inaccessible. The volume migration with data copy between appliance 1 and appliance 2 is performed in the background on the array side. The states remain the same until all of the data is copied from appliance 1 to appliance 2. Once the data is copied, the namespace NS0 on ports P0 and P2 are in sync with the namespace on ports P5 and P7.

Figure 3D:
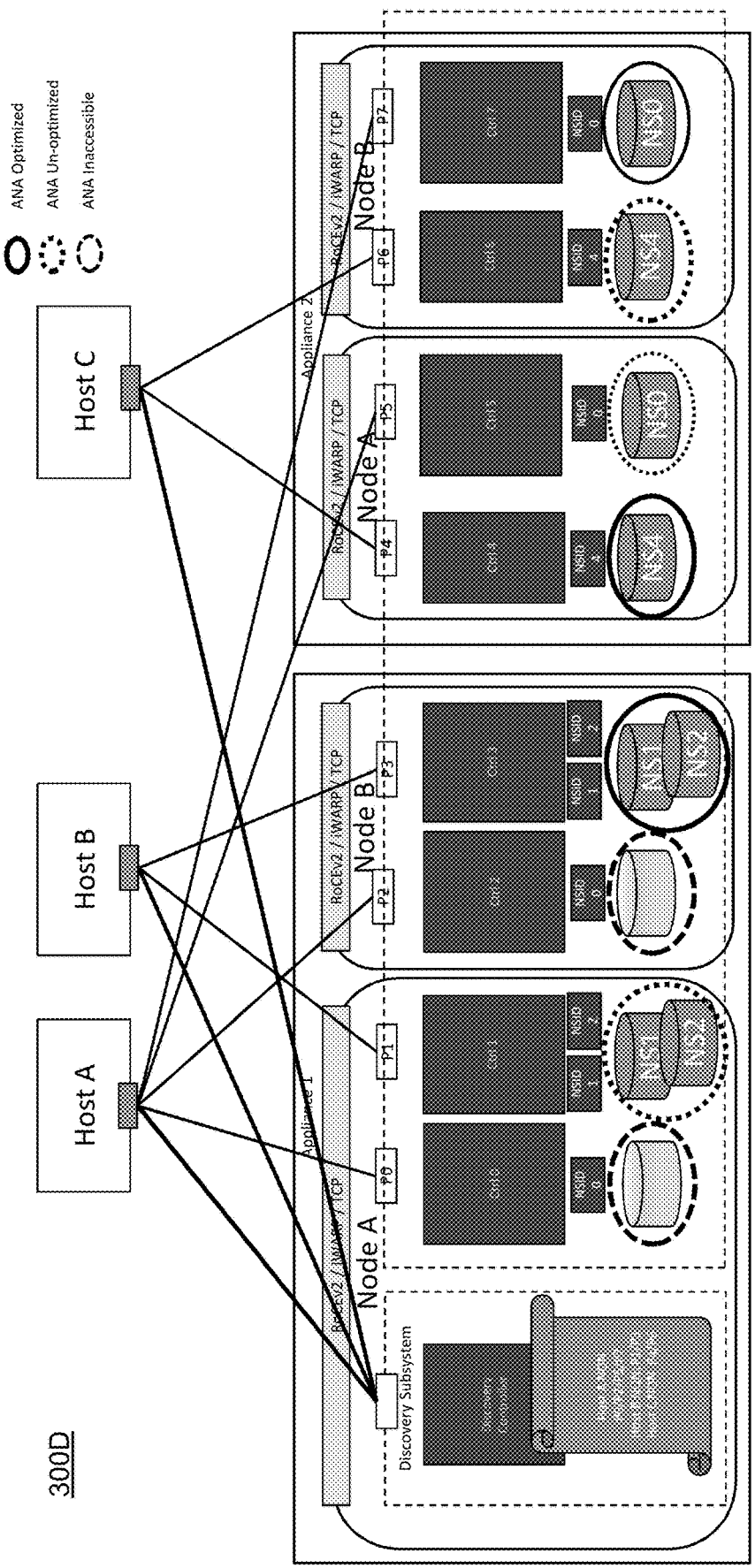

Once the data copying is complete and in sync, the paths are changed as shown in FIG. 3D. As shown in FIG. 3D, the namespace on ports P0 and P2 are inaccessible, the port P7 is optimized, and the port P5 is non-optimized. No rescan is required on the host side and not all appliances require connection to the host such that the host A does not exceed its path limits to the same namespace.

Figure 3E:
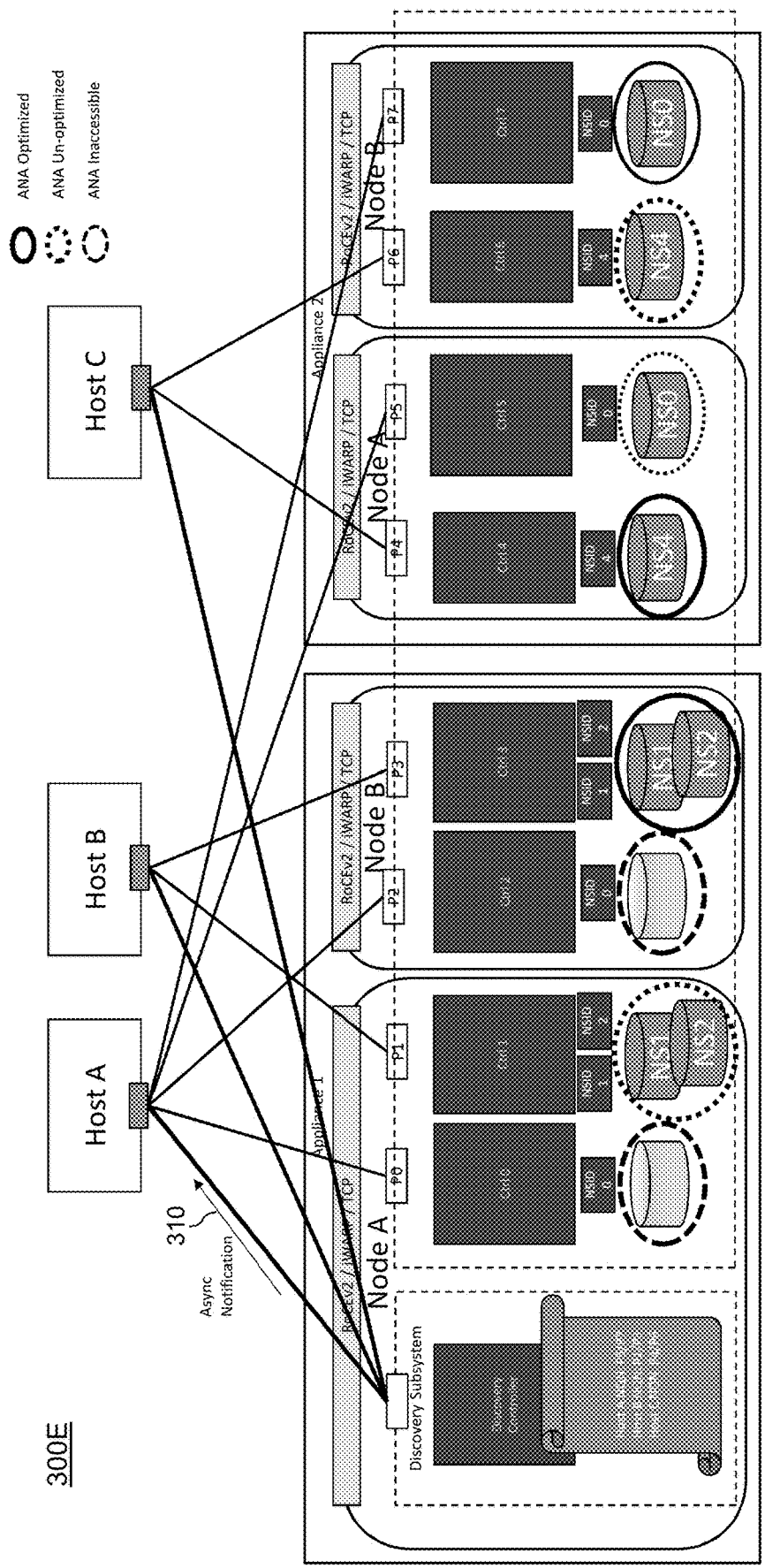
Figure 3F:
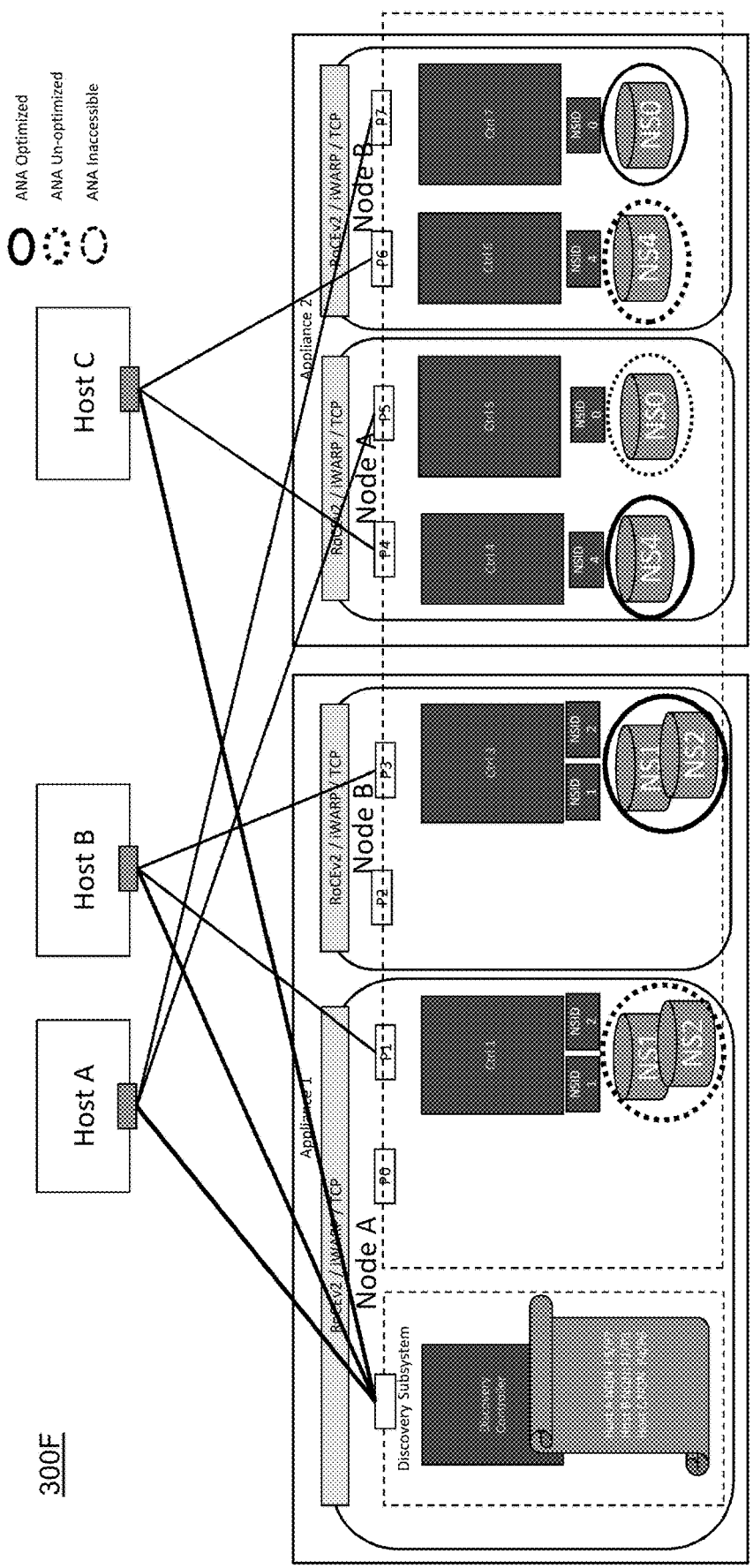

In FIG. 3E, the discovery controller informs the host A not to access the storage from ports P0 and P2 via an async notification 310. In FIG. 3F, the controllers for ports P0 and P2 are removed.

The process of FIGS. 3A-3F provides an embodiment in which a single namespace exists for a given controller and subject to migrating. It is understood that multiple namespaces may exist for a single controller and port. Turning to FIGS. 4A-4G, a process for migrating a single namespace from a group of namespaces, each belonging to the same controller and port, will now be described. The system 400A-400G of FIG. 4 is substantially similar to the system 200 of FIG. 2 with the exception that the assignment of namespaces among the appliances has changed.

Figure 4A:
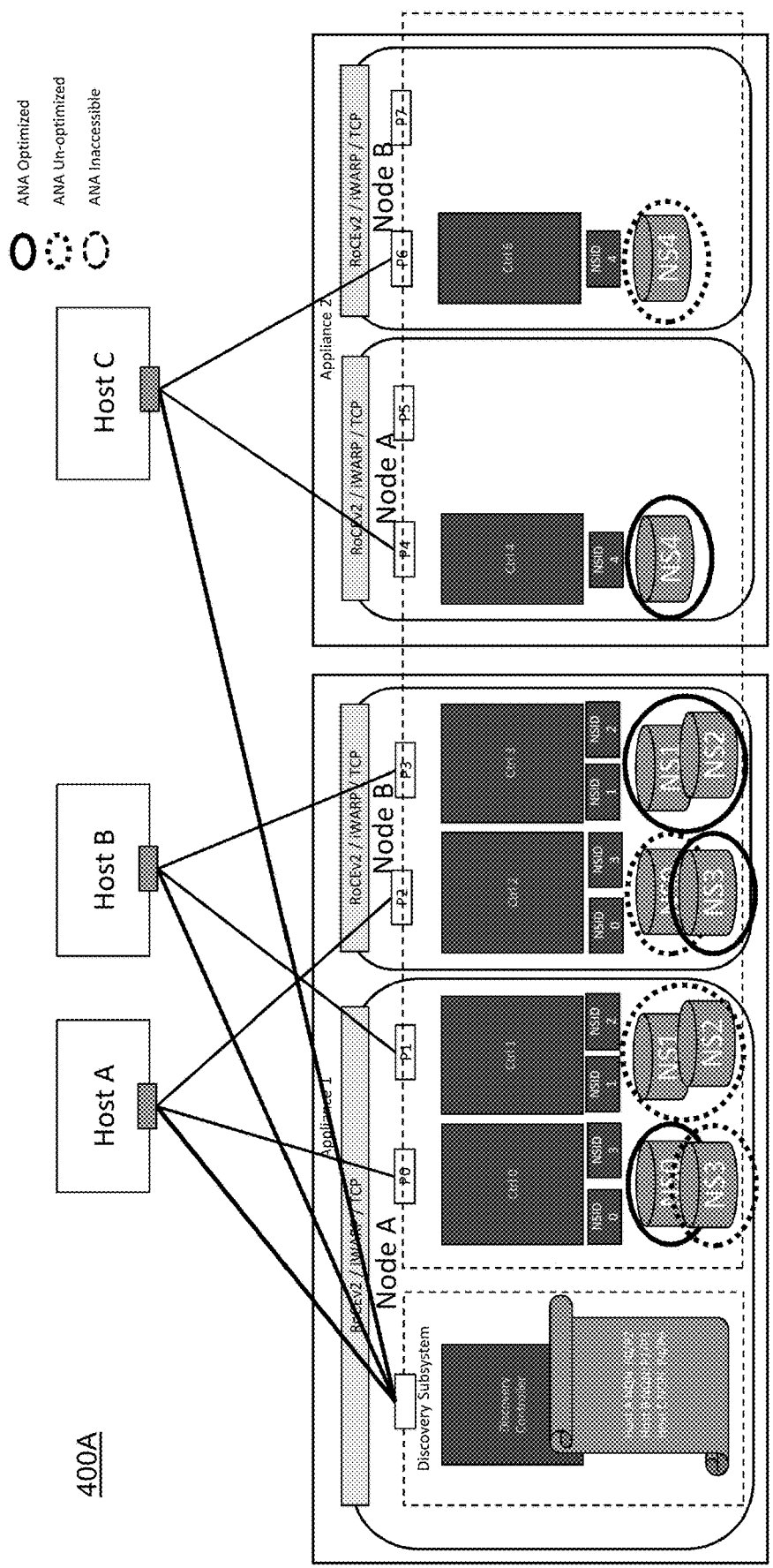
FIGS. 4A-4F are block diagrams of a system showing sequences of operations performed to implement the volume migration in a federated storage array in accordance with another embodiment.
Figure 4B:
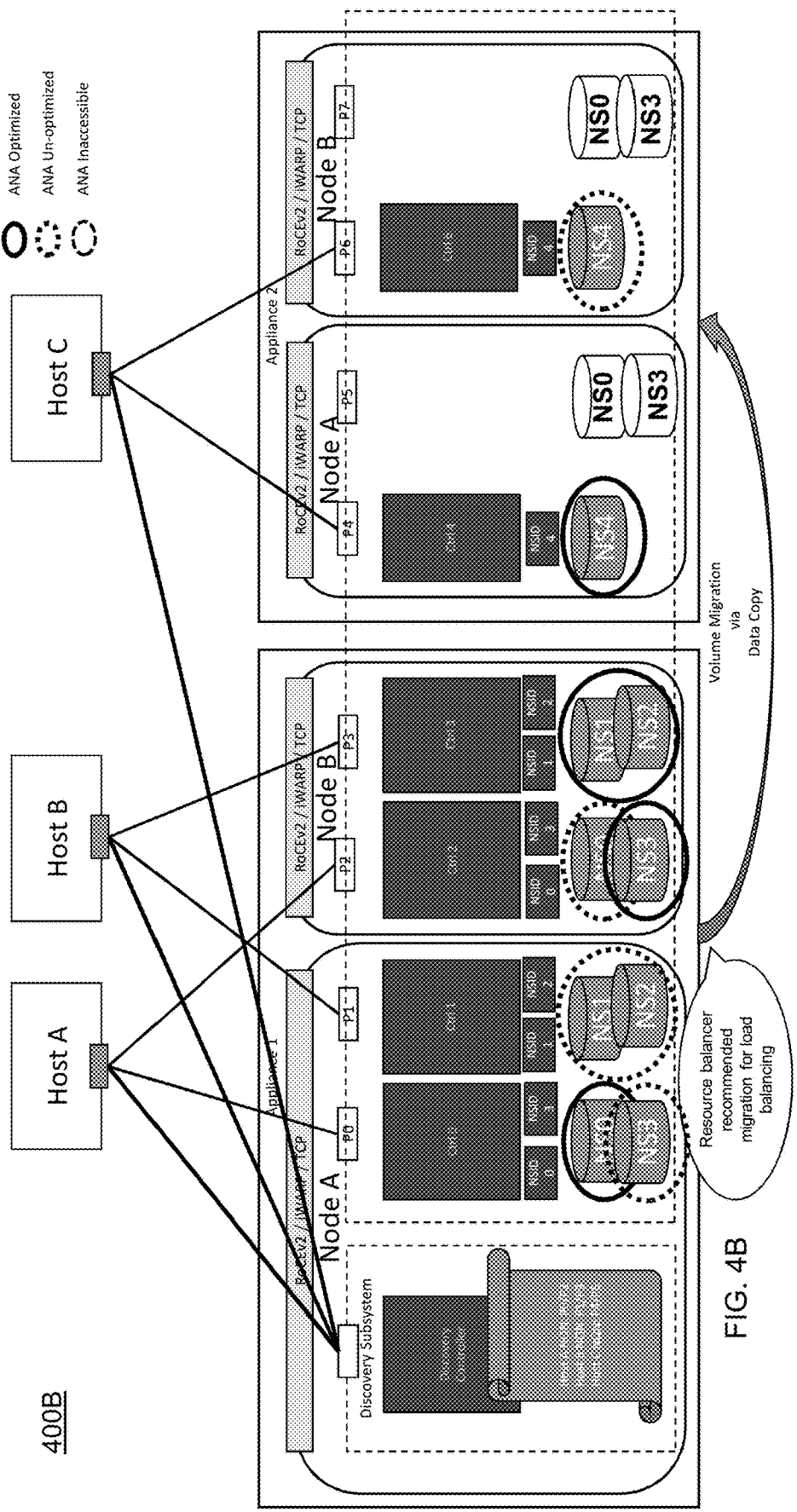

In FIG. 4A, host A has current access to namespaces NS0 and NS3 via appliance 1 using ports P0 and P2 on respective nodes A and B. In this scenario, the system (e.g., a resource balancer) recommends migration of only NS0 and not NS3, which both belong to the same port/controller. A shadow copy of both NS0 and NS3 needs to be created on the destination appliance (appliance 2) so that all controllers report identical namespace lists (NSIDs) to the host. The shadow copy refers to a copy destination for a namespace during migration. Nameless cylinders within appliance 2 on 300C are "shadow copies." The "shadow," copies are reported as namespaces, but are inaccessible and have incomplete data. This is shown in FIG. 4B in nodes A and B of appliance 2.

Figure 4C:
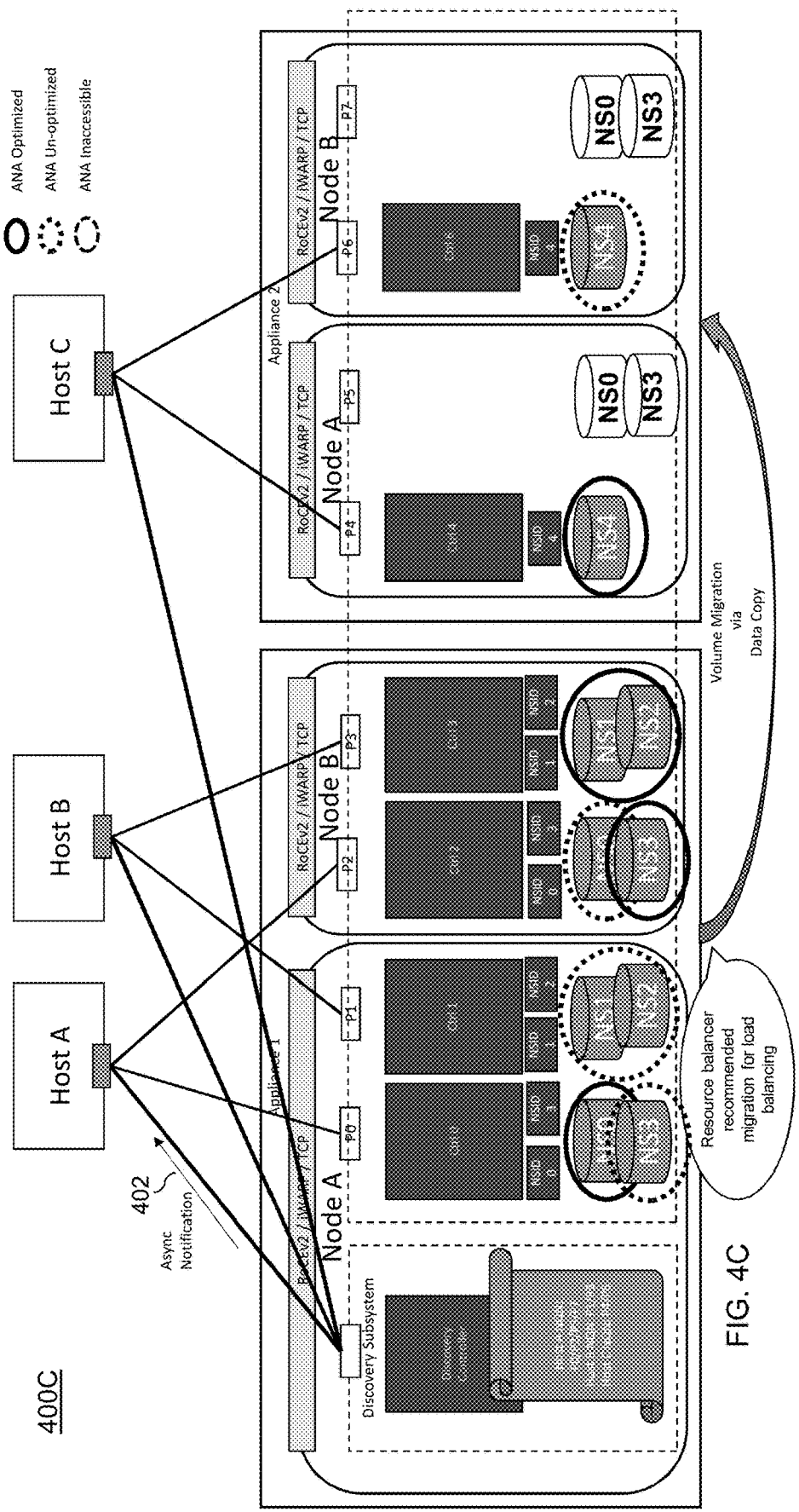
Figure 4D:
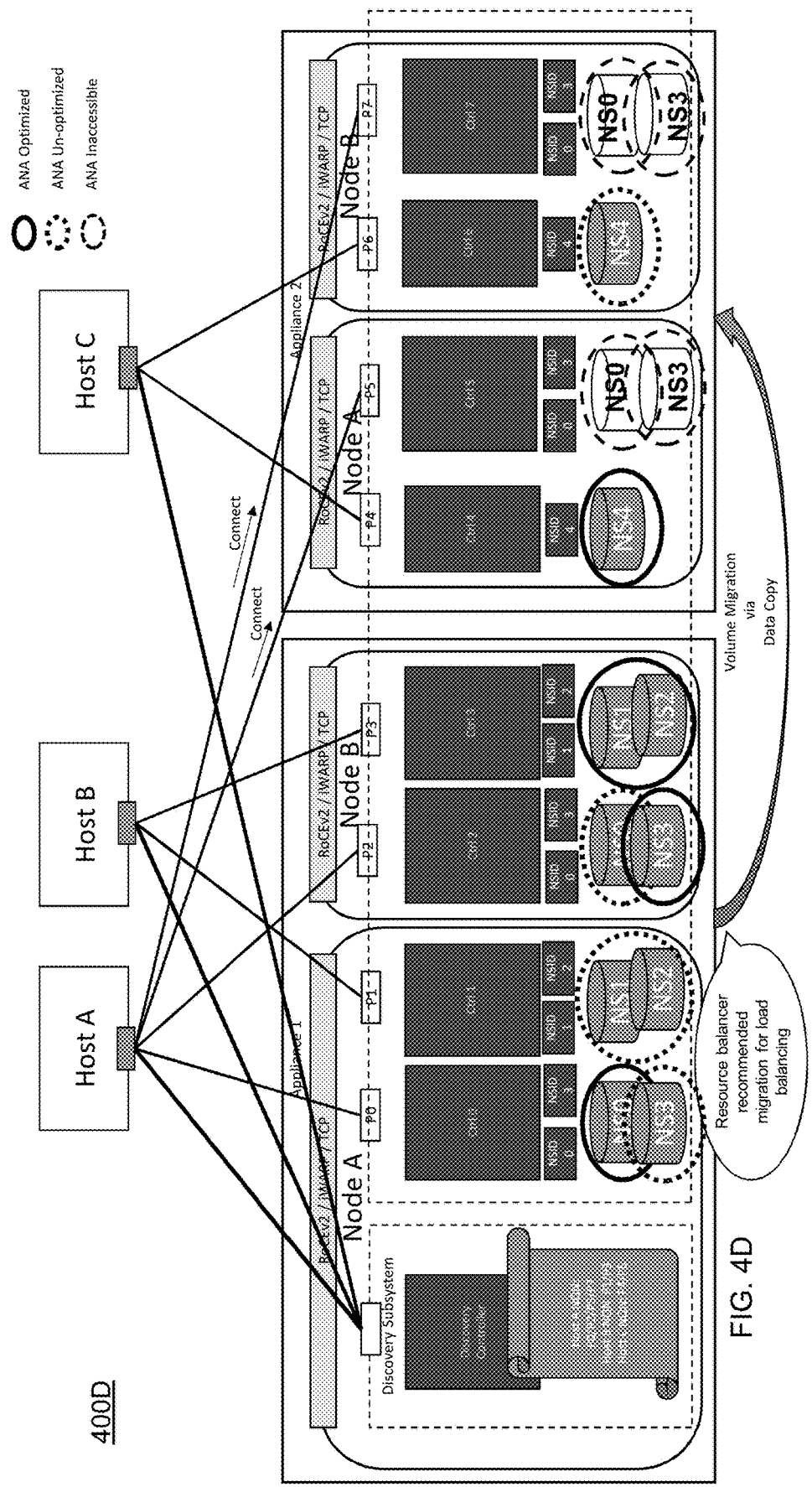

In FIG. 4C, the discovery controller sends an async notification 402 to host A. In FIG. 4D, the host A connects to the appliance 2 via the ports P5 and P7 and the namespaces NS0 and NS3 in nodes A and B of appliance 2 are designated inaccessible.

Before changing ANA states on NS0, sync is successfully enabled for NS0 between the source and destination appliances. All IO in progress are flushed from the source namespace to the destination namespace. Incoming NVMe commands are frozen (e.g., a freeze duration may be about 1.5 seconds). ANA states are then changed to reflect the cutover and IO are released.

Figure 4E:
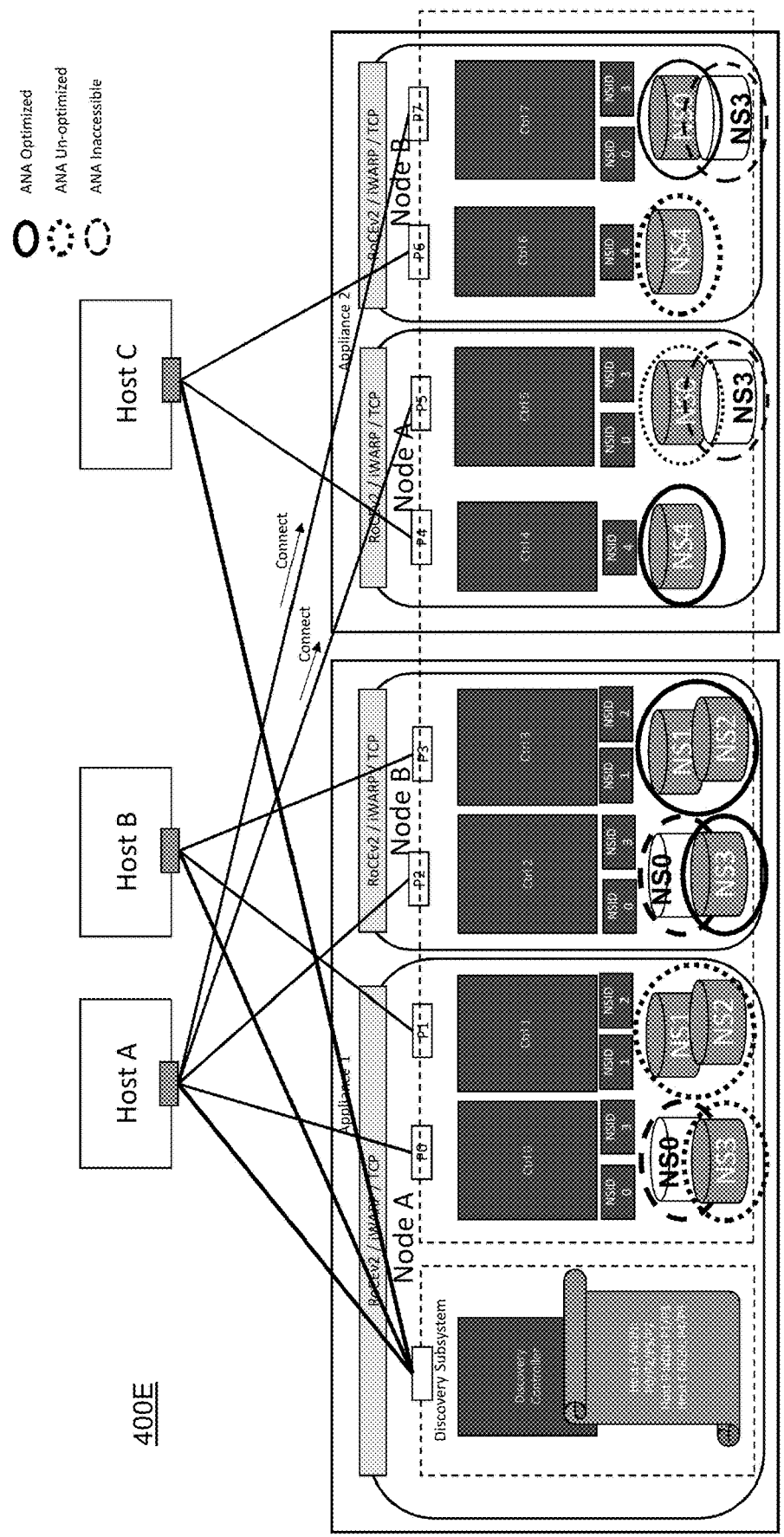

In FIG. 4D, the host A connects to the ports P5 and P7; however, they are designated inaccessible. The host A continues to use appliance 1 until the assignments are changed. In FIG. 4E, the assignments are completed. NS0 on port 7 of appliance 2 is optimized while the shadow namespace NS3 on port 7 is inaccessible. The namespace NS0 on port 5 is non-optimized, while the namespace NS3 on port 5 is inaccessible. In appliance 1, NS0 on port 0 is inaccessible, and namespace NS3 is non-optimized. NS0 on port 2 of appliance 1 is inaccessible, while namespace NS3 on port 2 is optimized.

Figure 4F:
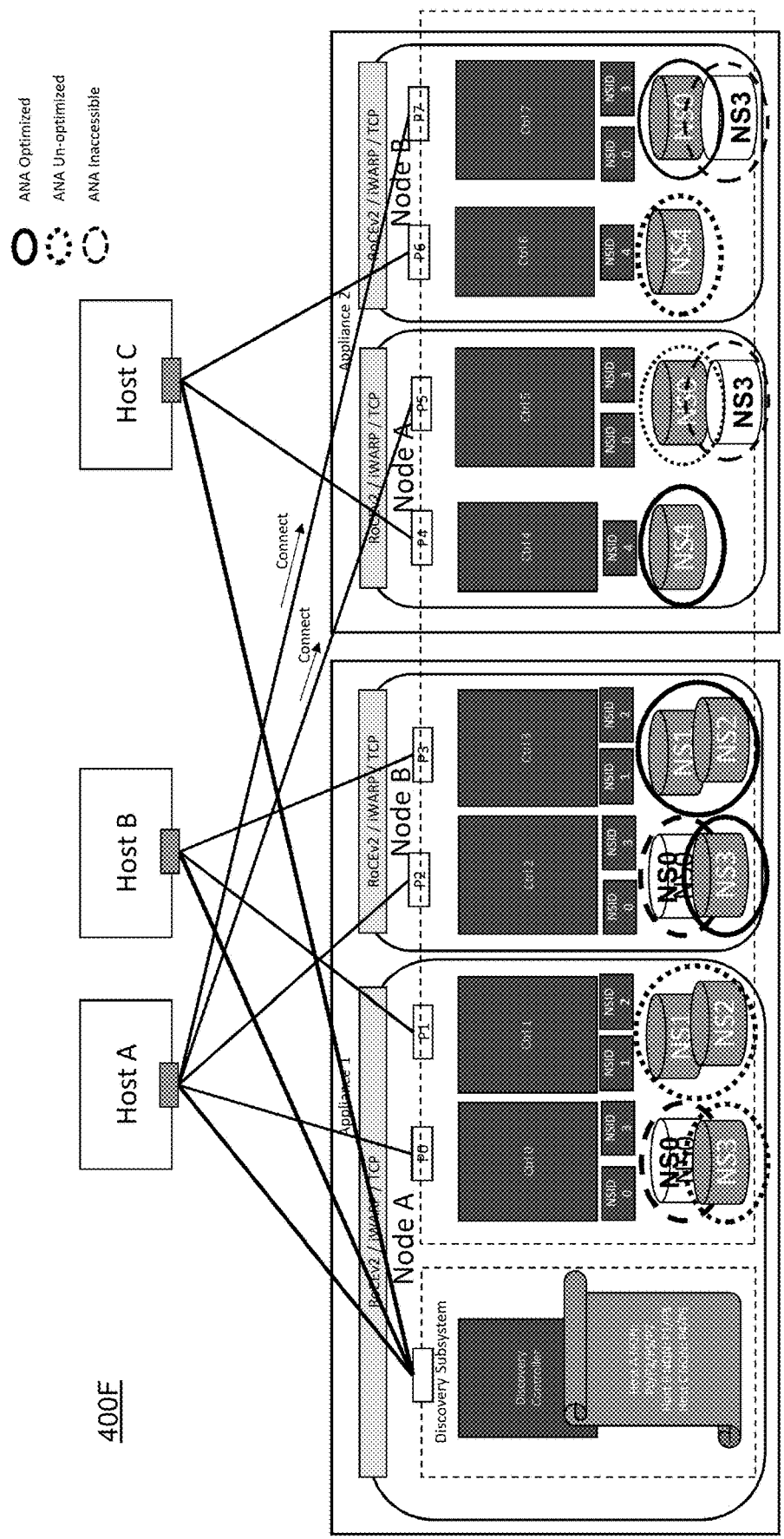

In FIG. 4F, the namespace NS0 attached to controllers 0 and 2 are replaced with a shadow volume. NS0 is replaced with shadow volume to ensure that all controllers are reporting the same set of namespaces per NVMeoF specifications.

Figure 5:
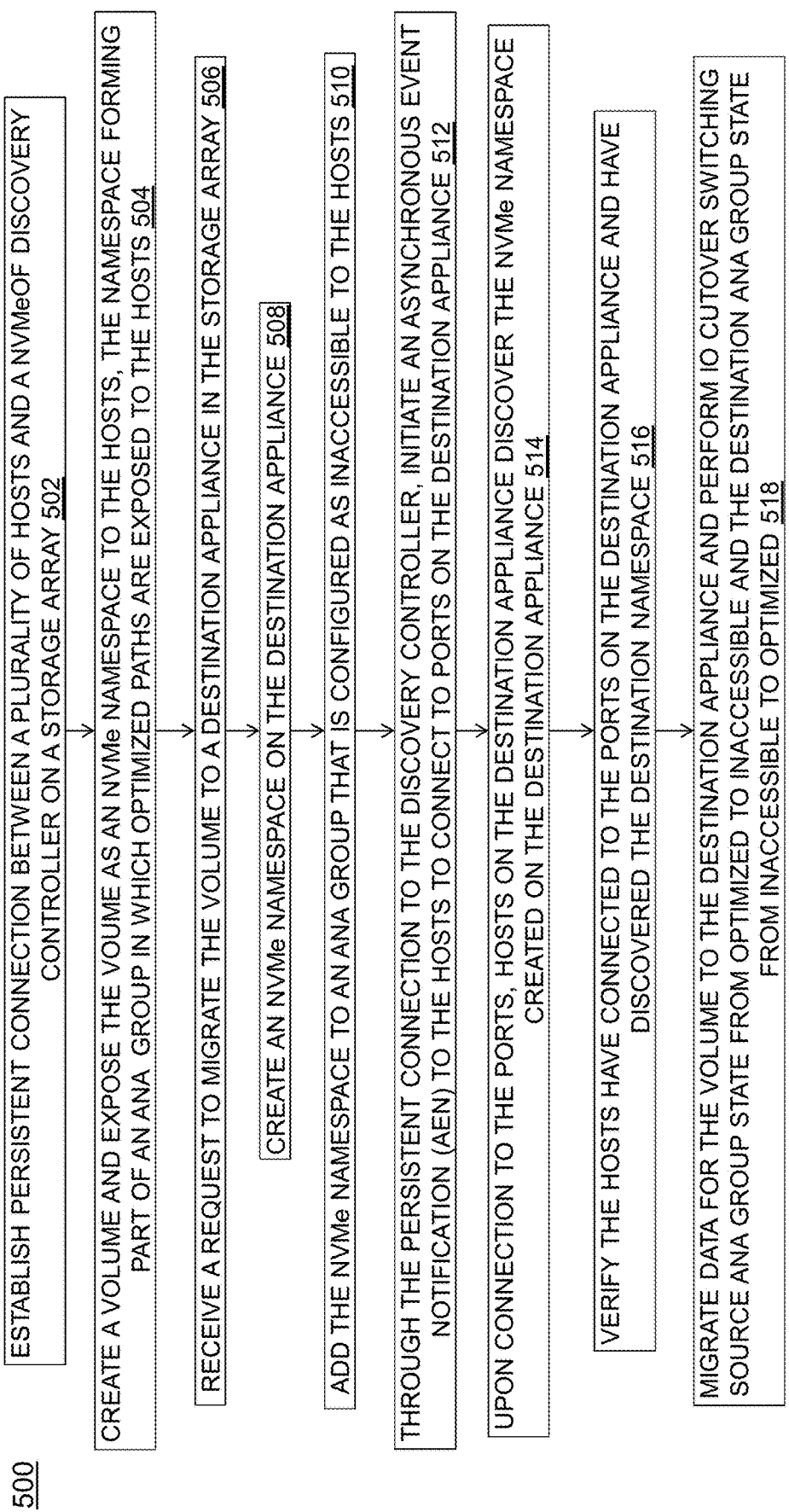
FIG. 5 is a flow diagram of a process for implementing volume migration in a federated storage array in accordance with an embodiment.

Turning now to FIG. 5, a flow diagram of a process 500 for implementing volume migration in a federated storage array will now be described. In block 502, the process 500 establishes a persistent connection (e.g., connections 202A-202C in FIG. 2) between hosts and a non-volatile memory over fabric (NVMeoF) discovery controller for appliances residing in the storage array.

In block 504, the process 500 creates a volume and exposes the volume as a namespace to the hosts. The namespace form part of an asymmetric namespace access (ANA) group in which optimized paths are exposed to the hosts.

In block 506 upon receiving a request to migrate the volume from a source appliance of the appliances to a destination appliance of the appliances, the process 500 creates a NVMeoF namespace on the destination appliance using the same namespace identifier (NSID) as on the source appliance in block 508. In block 510, the process 500 ensures that the NVMeoF namespace is part of the same ANA group as was on the source appliance but is being accessed as inaccessible.

In block 512, through the persistent connection to the discovery controller, the process initiates an asynchronous event notification (AEN) to the host to connect ports on the destination appliance. In block 514, upon connecting to the ports, the process 500 discovers, by the hosts on the destination appliance, the NVMeoF namespace created on the destination appliance. In block 516, the process 500 verifies the hosts have connected to the ports and have discovered the NVMeoF namespace. In block 518, the process migrates data for the volume to the destination appliance and performs input/output (IO) cutover. The IO cutover switches a state of the ANA group on the source appliance from optimized to inaccessible and a state of the ANA group on the destination appliance from inaccessible to optimized.

FIG. 6 shows an exemplary computer 600 (e.g., physical or virtual) that can perform at least part of the processing described herein. The computer 600 includes a processor 602, a volatile memory 604, a non-volatile memory 606 (e.g., hard disk or flash), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for implementing volume migration in a storage array comprising:
    establishing a persistent connection between hosts and a non-volatile memory express over fabric (NVMeoF) discovery controller for appliances residing in the storage array;
    creating a volume and exposing the volume as a namespace to the hosts, the namespace forming part of an asymmetric namespace access (ANA) group in which preferred paths are exposed to the hosts;
    upon receiving a request to migrate the volume from a source appliance of the appliances to a destination appliance of the appliances:
    creating a NVMeoF namespace on the destination appliance;
    configuring the ANA group of the NVMeoF namespace as inaccessible;
    through the persistent connection to the discovery controller, initiating an asynchronous event notification (AEN) to the host to connect ports on the destination appliance, the ports on the destination appliance corresponding to paths to the destination appliance that are currently inaccessible;
    upon connecting to the ports, discovering by the hosts on the destination appliance, the NVMeoF namespace created on the destination appliance;
    verifying the hosts have connected to the ports and have discovered the NVMeoF namespace; and
    migrating data for the volume to the destination appliance and performing input/output (IO) cutover.

2. The method of claim 1, wherein performing the IO cutover includes switching a state of the ANA group on the source appliance from preferred to inaccessible and a state of the ANA group on the destination appliance from inaccessible to preferred.

3. The method of claim 1, wherein the request to migrate the volume corresponds to a request to load balance appliances on the storage array.

4. The method of claim 1, wherein the request to migrate the volume corresponds to a request to perform maintenance on the storage array.

5. The method of claim 1, wherein the volume is one of a set of volumes corresponding to a controller and port, the method further comprising:
    upon selecting the volume in the set for migration, creating a shadow NVMeoF namespace on the destination appliance, the shadow NVMeoF namespace designated as inaccessible to the host.

6. The method of claim 1, wherein the NVMeoF namespace is provided to, and accessible by, multiple nodes in the source appliance.

7. A system for implementing volume migration in a storage array, comprising:
    a memory comprising computer-executable instructions; and
    a processor executing the computer-executable instructions, the computer-executable instructions when executed by the processor cause the processor to perform operations comprising:
    establishing a persistent connection between hosts and a non-volatile memory express over fabric (NVMeoF) discovery controller for appliances residing in the storage array;
    creating a volume and exposing the volume as a namespace to the hosts, the namespace forming part of an asymmetric namespace access (ANA) group in which preferred paths are exposed to the hosts;
    upon receiving a request to migrate the volume from a source appliance of the appliances to a destination appliance of the appliances:
    creating a NVMeoF namespace on the destination appliance;
    configuring the ANA group of the NVMeoF namespace as inaccessible;
    through the persistent connection to the discovery controller, initiating an asynchronous event notification (AEN) to the host to connect ports on the destination appliance, the ports on the destination appliance corresponding to paths to the destination appliance that are currently inaccessible;
    upon connecting to the ports, discovering by the hosts on the destination appliance, the NVMeoF namespace created on the destination appliance;
    verifying the hosts have connected to the ports and have discovered the NVMeoF namespace; and
    migrating data for the volume to the destination appliance and performing input/output (IO) cutover.

8. The system of claim 7, wherein performing the IO cutover includes switching a state of the ANA group on the source appliance from preferred to inaccessible and a state of the ANA group on the destination appliance from inaccessible to preferred.

9. The system of claim 7, wherein the request to migrate the volume corresponds to a request to load balance appliances on the storage array.

10. The system of claim 7, wherein the request to migrate the volume corresponds to a request to perform maintenance on the storage array.

11. The system of claim 7 wherein the volume is one of a set of volumes corresponding to a controller and port, the operations further comprising:
    upon selecting the volume in the set for migration, creating a shadow NVMeoF namespace on the destination appliance, the shadow NVMeoF namespace designated as inaccessible to the host.

12. The system of claim 7, wherein the NVMeoF namespace is provided to, and accessible by, multiple nodes in the source appliance.

13. A computer program product for implementing volume migration in a storage array, the computer program product embodied on a non-transitory computer readable medium, the computer program product including instructions that, when executed by a computer, causes the computer to perform operations comprising:
    establishing a persistent connection between hosts and a non-volatile memory express over fabric (NVMeoF) discovery controller for appliances residing in the storage array;
    creating a volume and exposing the volume as a namespace to the hosts, the namespace forming part of an asymmetric namespace access (ANA) group in which preferred paths are exposed to the hosts;

upon receiving a request to migrate the volume from a source appliance of the appliances to a destination appliance of the appliances:
creating a NVMeoF namespace on the destination appliance;
configuring the ANA group of the NVMeoF namespace as inaccessible;
through the persistent connection to the discovery controller, initiating an asynchronous event notification (AEN) to the host to connect ports on the destination appliance, the ports on the destination appliance corresponding to paths to the destination appliance that are currently inaccessible;
upon connecting to the ports, discovering by the hosts on the destination appliance, the NVMeoF namespace created on the destination appliance;
verifying the hosts have connected to the ports and have discovered the NVMeoF namespace; and
migrating data for the volume to the destination appliance and performing input/output (IO) cutover.

14. The computer program product of claim 13, wherein performing the IO cutover includes switching a state of the ANA group on the source appliance from preferred to inaccessible and a state of the ANA group on the destination appliance from inaccessible to preferred.

15. The computer program product of claim 13, wherein the request to migrate the volume corresponds to a request to load balance appliances on the storage array.

16. The computer program product of claim 13, wherein the request to migrate the volume corresponds to a request to perform maintenance on the storage array.

17. The computer program product of claim 13, wherein the volume is one of a set of volumes corresponding to a controller and port, the operations further comprising:
upon selecting the volume in the set for migration, creating a shadow NVMeoF namespace on the destination appliance, the shadow NVMeoF namespace designated as inaccessible to the host.

18. The computer program product of claim 13, wherein the NVMeoF namespace is provided to, and accessible by, multiple nodes in the source appliance.

* * * * *